US010449469B2

(12) United States Patent
Lewis (10) Patent No.: US 10,449,469 B2
(45) Date of Patent: Oct. 22, 2019

(54) OIL EXTRACTION AIDS IN BIOPRODUCT PRODUCTION

(71) Applicant: Solenis Technologies, L.P., Schaffhausen (CH)

(72) Inventor: Scott Romak Lewis, Wilmington, DE (US)

(73) Assignee: SOLENIS TECHNOLOGIES, L.P., Schaffhausen (CH)

(*) Notice: Subject to any disclaimer, the term of this patent is extended or adjusted under 35 U.S.C. 154(b) by 0 days.

(21) Appl. No.: 15/848,560

(22) Filed: Dec. 20, 2017

(65) Prior Publication Data

US 2018/0200644 A1   Jul. 19, 2018

Related U.S. Application Data

(60) Provisional application No. 62/447,077, filed on Jan. 17, 2017.

(51) Int. Cl.

| B01D 11/04 | (2006.01) |
|---|---|
| C11B 3/00 | (2006.01) |
| C11B 1/10 | (2006.01) |
| C10L 1/02 | (2006.01) |
| C11B 13/00 | (2006.01) |
| C10L 1/18 | (2006.01) |
| A23D 9/00 | (2006.01) |
| A23D 9/02 | (2006.01) |
| C11B 1/02 | (2006.01) |

(52) U.S. Cl.

CPC .......... *B01D 11/0492* (2013.01); *A23D 9/00* (2013.01); *A23D 9/02* (2013.01); *C10L 1/02* (2013.01); *C10L 1/1802* (2013.01); *C11B 1/02* (2013.01); *C11B 1/10* (2013.01); *C11B 3/006* (2013.01); *C11B 13/00* (2013.01); *C10L 2200/0484* (2013.01); *C10L 2290/141* (2013.01); *C10L 2290/544* (2013.01)

(58) Field of Classification Search
CPC ........ B01D 11/0492; A32D 9/00; A23D 9/02; C10L 1/02; C10L 1/1802; C11B 1/02; C11B 1/10; C11B 3/006; C11B 13/00
USPC ....................................................... 554/177
See application file for complete search history.

(56) References Cited

U.S. PATENT DOCUMENTS

| 7,602,858 | B2 | 10/2009 | Dally |
|---|---|---|---|
| 8,841,469 | B2 | 9/2014 | Sheppard et al. |
| 8,962,059 | B1 * | 2/2015 | Froderman ............... C11B 3/16 |
| | | | 426/601 |
| 9,255,239 | B1 | 2/2016 | Wiese |

(Continued)

FOREIGN PATENT DOCUMENTS

| WO | 9013533 A1 | 11/1990 |
|---|---|---|
| WO | 2015057191 A1 | 4/2015 |
| WO | 2016114983 A1 | 7/2016 |

OTHER PUBLICATIONS

Davis, Kelly S., Corn Milling, Porcessing and Genration of Co-Products, Minnesota Nutrition Conference, Technical Symposium, Sep. 11, 2001.

(Continued)

*Primary Examiner* — Deborah D Carr
(74) *Attorney, Agent, or Firm* — Lorenz & Kopf, LLP (57) ABSTRACT

A method is provided for the use of a process additive system to improve the recovery of oil from a process stream generated in a bioproduct production process.

20 Claims, 1 Drawing Sheet

(56) References Cited

U.S. PATENT DOCUMENTS

| | | |
|---|---|---|
| 9,353,332 B2 | 5/2016 | Lewis et al. |
| 2008/0176298 A1 | 7/2008 | Randhava et al. |
| 2012/0245370 A1 | 9/2012 | Sheppard et al. |
| 2015/0284659 A1 | 10/2015 | Young |
| 2016/0115425 A1* | 4/2016 | Blankenburg ....... B01D 17/047 554/20 |

OTHER PUBLICATIONS

European Patent Office International Searching Authority, International Search Report and Written Opinion for International Application No. PCT/US2017/067576 dated Apr. 9, 2018.

* cited by examiner

OIL EXTRACTION AIDS IN BIOPRODUCT PRODUCTION

This application claims the benefit of U.S. provisional application No. 62/447,077, filed Jan. 17, 2017, the entire contents of which are hereby incorporated by reference.

FIELD OF THE INVENTION

This invention pertains to recovering oil from a bioproduct production process.

BACKGROUND OF THE INVENTION

There are two types of grain to ethanol processing, wet milling and dry milling. The central difference between the two processes is how they initially treat the grain. In wet milling, the grain is steeped in water, and then separated for processing in the first step. Dry milling, which is more common, requires a different process.

Figure 1:
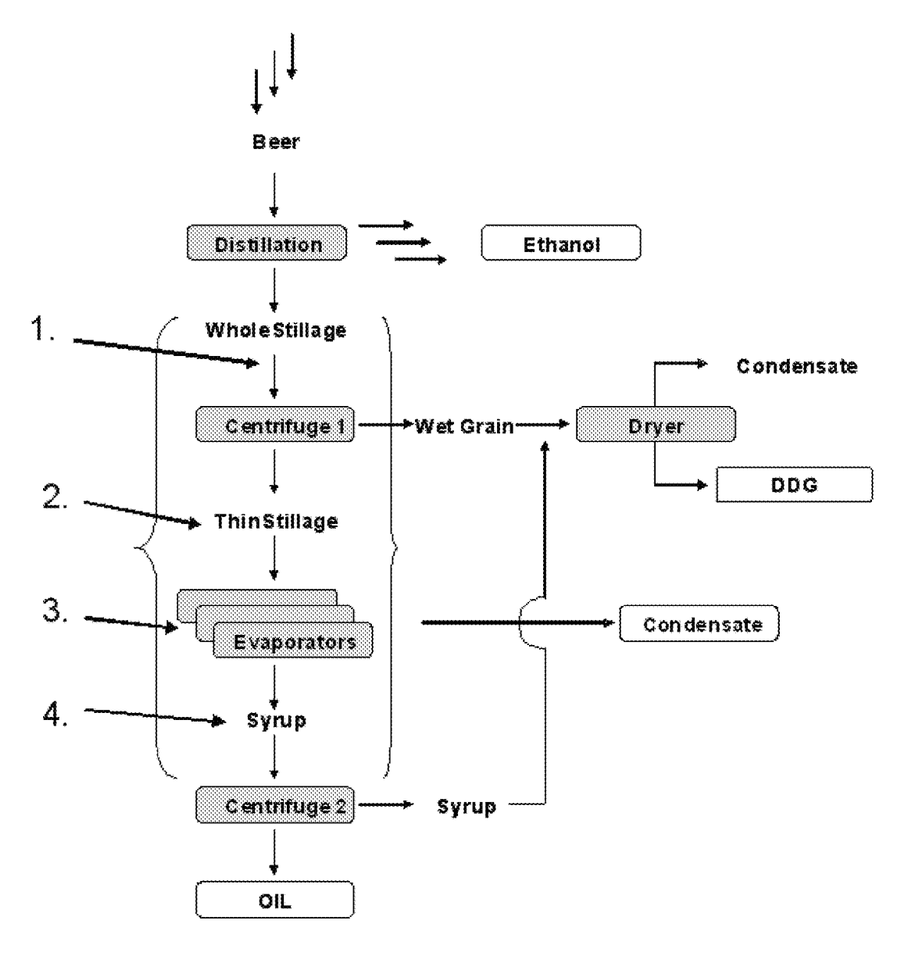
FIG. 1: Partial generic overview representative of corn to ethanol production indicating some addition points for the chemical additive: point 1—to the whole stillage prior to separation into wet cake and thin stillage, at or near the inlet to centrifuge 1; point 2—at or near the inlet of the evaporator; point 3—directly into the evaporator(s); point 4—to a point prior to or at the inlet of the oil centrifuge, centrifuge 2.

The corn dry milling process, also referred to as the dry grind process in this document, utilized in the production of ethanol is well known. For example see Kelly S. Davis, "Corn Milling, Processing and Generation of Co-Products", Minnesota Nutrition Conference, Technical Symposium, 11 Sep. 2001. Ethanol plants typically treat whole stillage from the beer column via centrifugation to produce wet cake and thin stillage then further treat the thin stillage stream by subjecting it to multiple effect evaporation to produce increase the solids and recover the distillate for return use in the process (FIG. 1). As solids increase the thin stillage is typically referred to as syrup (see FIG. 1). The syrup may be sold as a product, but is more typically combined with wet cake or distillers dry grains and sold as animal feed. These processes are well known in the industry and are generally employed in plant design in the industry.

In an effort to take advantage of co-product streams, many plants have added oil removal processes in which the thin stillage or syrup is subjected to processes, such as centrifugation or extraction, to remove corn oil from the syrup. For example, the application of centrifuges to the separation of corn oil from syrup is in wide use in the fuel ethanol industry. While the theoretical yield of oil per bushel of processed corn is 1.6 pound per bushel, many of the commercial installations fall far short of this. Increasing the corn oil production of a plant by 0.1 gallons per minute equates to an additional 400,000 pounds per year of additional oil production. This represents a significant source of additional revenue for the plant.

Recently there has been effort directed at increasing the value model of the corn to ethanol production process by extracting the oil from the thin stillage byproduct. U.S. Pat. No. 7,602,858 B2 describes a mechanical method of separating the oil from concentrated thin stillage, referred to as the "syrup", using a disc stack centrifuge. U.S. Pat. Appl. No. 2008/0176298 A1 teaches the use of an alkyl acetate solvent for extraction of corn oil in an ethanol production process.

Of particular interest are technologies which do not require the adoption of capital expenditures to implement a new mechanical solution and/or significant process change such as the use of an extraction solvent that requires recycling. U.S. Pat. Appl. No. 2012/0245370 A1 describes a method to improve the oil extraction process. When using known methods there is still some oil that is not recovered from the syrup. There is opportunity to further improve the oil recovery process.

Also of particular interest are technologies which employ process additives which have long shelf stability and are easily pumped and handled.

SUMMARY OF THE INVENTION

The present invention discloses a method for improving the separation of oil from process streams in a bioproduct production process. Bioproducts can include, but are not limited to, biofuels, such as ethanol or butanol, biomaterials, such as bio-based plastics and polymers, and other biochemicals. Preferably the bioproduct production processes involve the conversion of a grain to ethanol. Corn is the most common grain used for grain to ethanol production, but other grains including, but not limited to, wheat, sorghum (milo), and barley can also be used. The method comprises adding a process additive system to a process stream (including, but not limited to, mash, whole stillage, thin stillage, and/or syrup) generated in a bioproduct production process in order to enhance the mechanical separation of oil from the process stream. The process additive system comprises at least one first nonionic surfactant and at least one second nonionic surfactant, wherein the first nonionic surfactant comprises a functionalized polyol derived from a sorbitol, a sorbitan, or isosorbide and the second nonionic surfactant comprises an alkoxylated triglyceride.

Preferably the process additive system comprises materials that are recognized as safe such that it does not compromise the potential end use of the resulting dry distiller grain (DDG) as a feedstock.

In some instances the invention can provide the benefit of 1) increasing oil productions above that obtained with prior methods; and/or 2) reducing the amount of product required to obtain the same oil production; and/or 3) producing cleaner oil (high quality) by minimizing the suspended solids, water content, and/or other impurities in the resultant oil; and/or 4) reducing the maintenance of the centrifuge in the manner of reduced deposited materials thereby lessening the need for outages and cleanings as well as permitting extension of time between backflush purges leading to increased production and less down time also providing the value of simpler and easier cleaning of the centrifuge at outages; and/or 5) reducing maintenance of the evaporators in the manner of reduced deposited materials decreasing the frequency and complexity of cleanings, decreasing down time, and reducing costs.

DETAILED DESCRIPTION OF THE INVENTION

The present invention discloses a method for improving the separation of oil from process streams in a bioproduct production process. Bioproducts can include, but are not limited to, biofuels, such as ethanol or butanol, biomaterials, such as bio-based plastics and polymers, and other biochemicals. Preferably the bioproduct production process involves the conversion of a grain to ethanol and other coproducts. Corn is the most common grain used for grain to ethanol production, but other grains including, but not limited to, wheat, sorghum (milo), and barley can also be used. The method comprises adding a process additive system to a process stream (including, but not limited to, mash, whole stillage, thin stillage, and/or syrup) generated in a bioproduct production process in order to enhance the mechanical separation of oil from said streams.

The process additive system comprises at least one first nonionic surfactant and at least one second nonionic surfactant, wherein the first nonionic surfactant comprises a functionalized polyol derived from a sorbitol, a sorbitan, or isosorbide alkoxylated and the second nonionic surfactant comprises an alkoxylated triglyceride. For this invention, the first nonionic surfactant is not the same as the second nonionic surfactant. The ratio of the percent by weight of the first nonionic surfactant to the second nonionic surfactant may be from 1:9 to 9:1, preferably from 1:4 to 4:1, preferably from 1:3 to 3:1, preferably from 1:2 to 2:1, preferably from 2:3 to 4:1, preferably from 1:1 to 3:1.

Preferably, the first nonionic surfactant contains one or more functionalized polyols derived from sorbitan, more preferably one or more alkoxylated sorbitan alkylates, more preferably alkoxylated sorbitan esters, more preferably ethoxylated sorbitan esters, more preferably one or more Polysorbates. An example of a Polysorbate is Polysorbate 80 or Polysorbate 20.

The first nonionic surfactant may be used in an amount of at least 3% by weight based on the total weight of the process additive system, of at least 5% by weight based on the total weight of the process additive system, of at least 7% by weight based on the total weight of the process additive system, of at least 8% by weight based on the total weight of the process additive system, of at least 9% by weight based on the total weight of the process additive system, of at least 10% by weight based on the total weight of the process additive system, of at least 11% by weight based on the total weight of the process additive system, of at least 14% by weight based on the total weight of the process additive system, of at least 16% by weight based on the total weight of the process additive system, of at least 20% by weight based on the total weight of the process additive system, of at least 23% by weight based on the total weight of the process additive system, of at least 40% by weight based on the total weight of the process additive system, or of at least 50% by weight based on the total weight of the process additive system.

The first nonionic surfactant may be used in an amount from 10% to 90% by weight based on the total weight of the process additive system, from 20% to 80% by weight based on the total weight of the process additive system, from 25% to 75% by weight based on the total weight of the process additive system, from 33% to 67% by weight based on the total weight of the process additive system, from 40% to 80% by weight based on the total weight of the process additive system, or from 50% to 75% by weight based on the total weight of the process additive system.

Preferably, the second nonionic surfactant contains one or more alkoxylated esterified glycerols, more preferably one or more alkoxylated triglycerides, more preferably one or more alkoxylated triglycerides derived from a plant oil, more preferably one or more alkoxylated castor oils, more preferably ethoxylated castor oil, more preferably castor oil ethoxylated with from 15 to 60 moles of ethylene oxide, more preferably castor oil ethoxylated with from 25 to 50 moles of ethylene oxide.

The second nonionic surfactant may be used in an amount of at least 3% by weight based on the total weight of the process additive system, of at least 5% by weight based on the total weight of the process additive system, of at least 7% by weight based on the total weight of the process additive system, of at least 8% by weight based on the total weight of the process additive system, of at least 10% by weight based on the total weight of the process additive system, of at least 11% by weight based on the total weight of the process additive system, of at least 13% by weight based on the total weight of the process additive system, of at least 14% by weight based on the total weight of the process additive system, of at least 18% by weight based on the total weight of the process additive system, of at least 20% by weight based on the total weight of the process additive system, of at least 25% by weight based on the total weight of the process additive system, of at least 28% by weight based on the total weight of the process additive system, or of at least 31% by weight based on the total weight of the process additive system.

The second nonionic surfactant may be used in an amount from 10% to 90% by weight based on the total weight of the process additive system, from 20% to 80% by weight based on the total weight of the process additive system, from 25% to 75% by weight based on the total weight of the process additive system, from 33% to 67% by weight based on the total weight of the process additive system, from 20% to 60% by weight based on the total weight of the process additive system, or from 25% to 50% by weight based on the total weight of the process additive system.

The process additive system may further comprise silicon-based particles and/or other particles that aid in oil separation such as high-melting point waxes. Preferably, these are silicon-based particles. Preferable silicon-based particles are synthetic amorphous silicas, which include precipitated silicas, fumed silicas, colloidal silicas, thermal silicas, or silica gels. Preferred hydrophobic silicas comprise hydrophobic precipitated silicas, hydrophobic fumed silicas, and mixtures thereof. Examples of commercially available precipitated hydrophobic silicas include the Sipernat® D-series (Evonik Corporation, Parsippany, N.J.), Perform-O-Sil (Performance Process, Inc., Mundelein, Ill.), and Dumacil (Hi-Mar Specialty Chemicals, LLC, Milwaukee, Wis.) product lines. Examples of commercially available fumed hydrophobic silicas include the Aerosil® R-series (Evonik Corporation, Parsippany, N.J.), Profusil (Performance Process, Inc., Mundelein, Ill.), Cab-O-Sil® TS-series (Cabot Corporation, Billerica, Mass.), and HDK® H-series (Wacker Chemical Corporation, Adrian, Mich.) product lines. Silicon-based particles may be used in an amount of from about 1% to about 20% by weight based on the total weight of the process additive system, from about 3% to about 15% by weight based on the total weight of the process additive system, or from about 5% to about 15% by weight based on the total weight of the process additive system.

When silicon-based particles are used in the process additive system, it may be advantageous to have the ratio of the percent by weight of the first nonionic surfactant to the second nonionic surfactant be from 1:9 to 1:1, from 1:9 to 2:3, from 1:4 to 2:3. The first nonionic surfactant may be used in an amount of at least 3% by weight based on the total weight of the process additive system, of at least 5% by weight based on the total weight of the process additive system, of at least 7% by weight based on the total weight of the process additive system, of at least 14% by weight based on the total weight of the process additive system. The second nonionic surfactant may be used in an amount of at least 11% by weight based on the total weight of the process additive system, of at least 13% by weight based on the total weight of the process additive system, of at least 28% by weight based on the total weight of the process additive system, or of at least 31% by weight based on the total weight of the process additive system. It may be advantageous to use the first nonionic surfactant may in an amount from 10% to 50% by weight based on the total weight of the process additive system, from 10% to 40% by weight based on the total weight of the process additive system, or from 20% to 40% by weight based on the total weight of the process additive system. It may be advantageous to use the second nonionic surfactant in an amount from 50% to 90% by weight based on the total weight of the process additive system, from 60% to 90% by weight based on the total weight of the process additive system, or from 60% to 80% by weight based on the total weight of the process additive system.

Additional additives that are useful in the process additive system include fatty acid alkyl esters, PEG fatty acid esters, PEG fatty alcohol esters, monoglycerides, diglycerides, triglycerides, mineral oils, and/or fatty alcohols. Fatty alcohols typically have 4 to 26 carbons and one terminal hydroxyl group. These additional additives may also prove beneficial when they are added to modify the sedimentation stability, rheological properties, and/or elastic properties of the process additive system. Preferably, additional additives are fatty acid alkyl esters, preferably fatty acid methyl esters, preferably fatty acid methyl esters derived from soybean oil. Examples include, but are not limited to, soybean methyl esters, canola methyl esters, and soybean ethyl esters. The additional additives may be used in an amount from 0.1% to 50% by weight based on the total weight of the process additive system, from 1% to 50% by weight based on the total weight of the process additive system, from 5% to 40% by weight based on the total weight of the process additive system, or from 5% to 30% by weight based on the total weight of the process additive system.

The process additive system consists of less than 10% by weight of water based on the total weight of the process additive system, preferably less than 5% by weight of water based on the total weight of the process additive system.

The method consists of adding a process additive system to a grain, preferably corn, to ethanol process stream. The method involves treating any of the process streams, preferably thin stillage or syrup streams, in grain, preferably corn, to bioproduct, preferably ethanol, production with a process additive system which enhances the mechanical separation of oil from said streams.

The method comprises the addition of the process additive system to one or more process streams prior to the oil separation step. Preferably the process stream is the thin stillage and/or syrup concentrate. Preferably the oil separation from the concentrated syrup is achieved by a mechanical operation such as a membrane or centrifuge. The separation can be achieved by a centrifuge such as a disc stack or horizontal tricanter centrifuge. Other mechanical separators can also be used in the present invention including, but not limited to, reverse centrifugal cleaners.

In another aspect of the invention, the method comprises application of the process additive system to the whole stillage prior to separation into thin stillage and wet cake.

The process additive system may be added at different points in the separation system. Addition points for the process additive system include, but are not limited to, to the whole stillage prior to separation into wet cake and thin stillage, a point after the oil centrifuge feed pump but prior to the intake of the centrifuge, a point after the evaporators and prior to the pump that feeds the centrifuge, and a point after the syrup feed tank and before the centrifuge. Generally the syrup feed tank is located after the evaporators and before the centrifuge.

The process additive system may be added to the bioproduct production process streams via more than one addition point. The process additive systems added at each point does not need to have the same composition or be added at the same dosage as long as the total amounts of each component and the total dosage at all the addition points combined fall within the range specified for the process additive system.

FIG. 1 is a partial generic overview representative of corn to ethanol production. In a typical corn to ethanol process, after a number of different mashing and fermentation steps, the corn is converted to material referred to as "beer". The beer is then processed through a distillation process to separate the crude ethanol, leaving a stillage byproduct known as whole stillage. The whole stillage is subjected to a solid separation centrifugation process to yield distillers wet grain and thin stillage. The thin stillage is then typically processed through a number of evaporator units to yield the concentrated syrup. This syrup may then be further processed, for example by oil separation centrifugation, to separate the oil from the syrup. The remaining syrup is then typically combined with the distillers wet grain and dried, to yield dry distillers grains with solubles (DDGS). The process additive system of the present invention is typically added to the process stream at different points in the separation process. Some preferred addition points are shown in FIG. 1. Addition points include the whole stillage process stream prior to separation into wet cake and thin stillage, the process stream at or near the inlet to the centrifuge or after the solid separation centrifuge. The process additive system can be added, prior to or at the inlet and/or outlet of one or more of the thin stillage evaporators, in the evaporators, to the syrup just prior to the oil separation centrifuge and/or at the inlet of the premix or retention heat tanks. The areas in the process where the process additive system is typically charged are designated by the bracketed ("{ . . . }") area in the diagram.

Process additive systems useful in the present invention are those which provide an increase in oil production. The application of the process additive systems can be at one or more addition points such as within the thin stillage processing unit operations and/or can be applied to the syrup resulting from concentration of the thin stillage in an evaporator.

The process additive system can be added to the grain, preferably corn, to ethanol process stream (whole stillage, thin stillage or syrup) in an amount of from about 10 to about 2,000 ppm based on the weight of the process stream, from about 50 to about 2,000 ppm, or from about 50 to about 1,000 ppm. One ppm (part-per-million) is defined as 1 mg per liter. For example, 1 ppm of the process additive system indicates 1 mg of the process additive system in 1 liter (L) of the process stream.

The process additive system can be used at ambient temperature or can be heated and applied to the process stream (whole stillage, thin stillage, or syrup). The temperature range to which it can be heated is above ambient temperature, from 18° C. to 100° C., from 25° C. to 85° C., from 30° C. to 80° C.

Use of the invention results in increased oil recovery at lower temperature. Reducing processing temperatures also leads to overall energy savings. Another added advantage of the invention is the ability to increase the oil yield at lower processing temperatures and mitigate the potential of the processed syrup to negatively impact the appearance and value of the DDG and the oil. A negative impact of processing the syrup at higher temperatures to improve the yield of oil, for example temperatures greater than 195° F. or 205° F. depending on the process, is that discoloration of the syrup results, which imparts a negative appearance to the dry distillers grain (DDG) and lessens the value of this material. The higher processing temperatures can cause higher color of the oil itself.

The present invention includes the following embodiments or features in any combination:

A method of recovering oil from a process stream of a bioproduct production process, the method comprising adding a process additive system to a process stream in a bioproduct production process wherein the process additive system comprises at least one first nonionic surfactant and at least one second nonionic surfactant, wherein the first nonionic surfactant comprises a functionalized polyol derived from a sorbitol, a sorbitan, or isosorbide and the second nonionic surfactant comprises an alkoxylated triglyceride and wherein the first nonionic surfactant comprises at least 3% of the total weight of the process additive system and the second nonionic surfactant comprises at least 3% of the total weight of the process additive system.

The method of any preceding embodiment or feature wherein the first nonionic surfactant comprises a functionalized polyol derived from a sorbitan.

The method of any preceding embodiment or feature wherein the first nonionic surfactant comprises a polysorbate.

The method of any preceding embodiment or feature wherein the second nonionic surfactant comprises an alkoxylated castor oil.

The method of any preceding embodiment or feature wherein the second nonionic surfactant comprises an ethoxylated castor oil.

The method of any preceding embodiment or feature wherein the second nonionic surfactant comprises an alkoxylated castor oil that has been alkoxylated with from about 15 to about 60 moles of an alkyl oxide wherein the alkyl oxide is selected from ethylene oxide, propylene oxide and mixtures thereof.

The method of any preceding embodiment or feature wherein the second nonionic surfactant comprises an alkoxylated castor oil that has been alkoxylated with from about 25 to about 50 moles of an alkyl oxide wherein the alkyl oxide is selected from ethylene oxide, propylene oxide and mixtures thereof.

The method of any preceding embodiment or feature, wherein the process additive system further comprises silica wherein the silica comprises from 3% to 15% of the total weight of the process additive system.

The method of any preceding embodiment or feature wherein the silica comprises a hydrophobic silica.

The method of any preceding embodiment or feature wherein the ratio by weight of the first nonionic surfactant to the second nonionic surfactant is from 1:4 to 4:1.

The method of any preceding embodiment or feature, wherein the first nonionic surfactant comprises at least 5% of the total weight of the process additive system and the second nonionic surfactant comprises at least 5% of the total weight of the process additive system.

The method of any preceding embodiment or feature wherein the ratio by weight of the first nonionic surfactant to the second nonionic surfactant is from 1:3 to 3:1.

The method of any preceding embodiment or feature, wherein the first nonionic surfactant comprises at least 7% of the total weight of the process additive system and the second nonionic surfactant comprises at least 7% of the total weight of the process additive system.

The method of any preceding embodiment or feature wherein the ratio by weight of the first nonionic surfactant to the second nonionic surfactant is from 1:2 to 2:1.

The method of any preceding embodiment or feature, wherein the first nonionic surfactant comprises at least 8% of the total weight of the process additive system and the second nonionic surfactant comprises at least 8% of the total weight of the process additive system.

The method of any preceding embodiment or feature wherein the ratio by weight of the first nonionic surfactant to the second nonionic surfactant is from 2:3 to 4:1.

The method of any preceding embodiment or feature, wherein the first nonionic surfactant comprises at least 10% of the total weight of the process additive system and the second nonionic surfactant comprises at least 5% of the total weight of the process additive system.

The method of any preceding embodiment or feature wherein the ratio by weight of the first nonionic surfactant to the second nonionic surfactant is from 1:1 to 3:1.

The method of any preceding embodiment or feature, wherein the first nonionic surfactant comprises at least 11% of the total weight of the process additive system and the second nonionic surfactant comprises at least 7% of the total weight of the process additive system.

The method of any preceding embodiment or feature, wherein the first nonionic surfactant comprises at least 3% of the total weight of the process additive system and the second nonionic surfactant comprises at least 11% of the total weight of the process additive system.

The method of any preceding embodiment or feature, wherein the first nonionic surfactant comprises at least 3% of the total weight of the process additive system and the second nonionic surfactant comprises at least 13% of the total weight of the process additive system.

The method of any preceding embodiment or feature wherein the ratio by weight of the first nonionic surfactant to the second nonionic surfactant is from 1:4 to 2:3.

The method of any preceding embodiment or feature, wherein the first nonionic surfactant comprises at least 5% of the total weight of the process additive system and the second nonionic surfactant comprises at least 13% of the total weight of the process additive system.

The method of any preceding embodiment or feature, wherein the process additive system further comprises additional additives, wherein the additional additives comprise from 0.1% to 50% of the total weight of the process additive system, wherein at least one additional additive is selected from the group consisting of fatty acid alkyl esters, PEG fatty alcohol esters, monoglycerides, diglycerides, triglycerides, mineral oils, fatty alcohols, and combinations thereof.

The method of any preceding embodiment or feature, wherein the process additive system further comprises additional additives, wherein the additional additives comprise from 0.1% to 50% of the total weight of the process additive system, wherein at least one additional additive comprises PEG fatty acid esters.

The method of any preceding embodiment or feature, wherein the additional additives comprise fatty acid alkyl esters and wherein the additional additives comprises from 1% to 50% of the total weight of the process additive system.

The method of any preceding embodiment or feature, wherein the additional additives comprise fatty acid alkyl esters and wherein the additional additive comprises from 5% to 40% of the total weight of the process additive system.

The method of any preceding embodiment or feature, wherein the additional additives comprises fatty acid alkyl esters and wherein the additional additives comprise from 5% to 30% of the total weight of the process additive system.

The method of any preceding embodiment or feature, wherein the additional additives comprise fatty acid methyl esters.

The method of any preceding embodiment or feature, wherein the additional additives comprise soybean fatty acid methyl esters.

The method of any preceding embodiment or feature wherein the process additive system is added to the process stream in an amount of from 50 to 2000 ppm (mg/L) based on the weight of the process additive system and the volume of the process stream.

The method of any preceding embodiment or feature wherein the process additive system is added to the process stream in an amount of from 50 to 1000 ppm by weight based on the weight of the process stream.

A method of recovering oil from a process stream of a bioproduct production process, the method comprising the addition of a process additive system to a process stream in a bioproduct production process wherein the process additive system comprises at least one first nonionic surfactant and at least one second nonionic surfactant, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 2:3 to 4:1, wherein the first nonionic surfactant comprises at least 40% of the total weight of the process additive system and the second nonionic surfactant comprises at least 20% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant and at least one additional additive, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 2:3 to 4:1, wherein the first nonionic surfactant comprises at least 14% of the total weight of the process additive system and the second nonionic surfactant comprises an amount of at least 8% of the total weight of the process additive system, wherein the additional additives are selected from the group consisting of fatty acid alkyl esters, PEG fatty alcohol esters, monoglycerides, diglycerides, triglycerides, mineral oils, and fatty alcohols, and wherein the additional additives comprise from 0.1% to 50% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, and at least one additional additive, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 2:3 to 4:1, wherein the first nonionic surfactant comprises at least 20% of the total weight of the process additive system and the second nonionic surfactant comprises at least 11% of the total weight of the process additive system, and wherein the additional additives are selected from the group consisting of fatty acid alkyl esters, PEG fatty alcohol esters, monoglycerides, diglycerides, triglycerides, mineral oils and alcohols, and wherein the additional additives comprise from 5% to 30% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, and at least one additional additive, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 2:3 to 4:1, wherein the first nonionic surfactant comprises at least 14% of the total weight of the process additive system and the second nonionic surfactant comprises at least 8% of the total weight of the process additive system, wherein the additional additives comprise fatty acid methyl esters, and wherein the additional additives comprise from 0.1% to 50% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, and at least one additional additive, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 2:3 to 4:1, wherein the first nonionic surfactant comprises at least 20% of the total weight of the process additive system and the second nonionic surfactant comprises at least 11% of the total weight of the process additive system, wherein the additional additives comprise fatty acid methyl esters, and wherein the additional additives comprise from 5% to 30% of the total weight of the process additive system.

A method of recovering oil from a process stream of a bioproduct production process, the method comprising the addition of a process additive system to a process stream in a bioproduct production process wherein the process additive system comprises at least one a first nonionic surfactant and at least one second nonionic surfactant, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 1:1 to 3:1, wherein the first nonionic surfactant comprises at least 50% of the total weight of the process additive system and the second nonionic comprises at least 25% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, and at least one additional additive, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 1:1 to 3:1, wherein the first nonionic surfactant comprises at least 16% of the total weight of the process additive system and the second nonionic surfactant comprises at least 10% of the total weight of the process additive system, wherein the additional additives are selected from the group consisting of fatty acid alkyl esters, PEG fatty alcohol esters, monoglycerides, diglycerides, triglycerides, mineral oils and alcohols, and wherein the additional additives comprise from 0.1% to 50% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, and at least one additional additive, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 1:1 to 3:1, wherein the first nonionic surfactant comprises at least 23% of the total weight of the process additive system and the second nonionic surfactant comprises at least 14% of the total weight of the process additive system, wherein the additional additives are selected from the group consisting of fatty acid alkyl esters, PEG fatty alcohol esters, monoglycerides, diglycerides, triglycerides, mineral oils and alcohols, and wherein additional additives comprise from 5% to 30% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, and at least one additional additive, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 1:1 to 3:1, wherein the first nonionic surfactant comprises at least 16% of the total weight of the process additive system and the second nonionic surfactant comprises at least 10% of the total weight of the process additive system, wherein the additional additives comprise fatty acid methyl esters, and wherein the additional additives comprise from 0.1% to 50% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, and at least one additional additive, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 1:1 to 3:1, wherein the first nonionic surfactant comprises at least 23% of the total weight of the process additive system and the second nonionic surfactant comprises at least 14% of the total weight of the process additive system, wherein the additional additives comprise fatty acid methyl esters, and wherein the additional additives comprise from 5% to 30% of the total weight of the process additive system.

A method of recovering oil from a process stream of a bioproduct production process, the method comprising the addition of a process additive system to a process stream in a bioproduct production process wherein the process additive system comprises at least one first nonionic surfactants, at least one second nonionic surfactant and hydrophobic silica, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 1:4 to 2:3, wherein the first nonionic surfactant comprises at least 14% of the total weight of the process additive system and the second nonionic surfactant comprises at least 31% of the total weight of the process additive system, wherein the hydrophobic silica comprises from 3% to 15% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, at least one additional additive and hydrophobic silica, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 1:4 to 2:3, wherein the first nonionic surfactant comprises at least 5% of the total weight of the process additive system and the second nonionic surfactant comprises at least 13% of the total weight of the process additive system, wherein the hydrophobic silica comprises from 3% to 15% of the total weight of the process additive system, wherein the additional additives are selected from the group consisting of fatty acid alkyl esters, PEG fatty alcohol esters, monoglycerides, diglycerides, triglycerides, mineral oils and alcohols, and wherein the additional additives comprise from 0.1% to 50% of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, at least one additional additive and hydrophobic silica, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 1:4 to 2:3, wherein the first nonionic surfactant comprises at least 9% of the total weight of the process additive system and the second nonionic surfactant comprises at least 20% of the total weight of the process additive system, wherein the hydrophobic silica comprises from 3% to 15% of the total weight of the process additive system, wherein the additional additives are selected from the group consisting of fatty acid alkyl esters, PEG fatty alcohol esters, monoglycerides, diglycerides, triglycerides, mineral oils and alcohols, and wherein additional additives comprise from 5% to 30% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, at least one additional additive and hydrophobic silica, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 1:4 to 2:3, wherein the first nonionic surfactant comprises at least 5% of the total weight of the process additive system and the second nonionic surfactant comprises at least 13% of the total weight of the process additive system, wherein the hydrophobic silica comprises from 3% to 15% of the total weight of the process additive system, wherein the additional additives comprise fatty acid methyl esters, and wherein the additional additives comprise from 0.1% to 50% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, at least one additional additive and hydrophobic silica, wherein the first nonionic surfactant comprises a functionalized polyol derived from a sorbitol, a sorbitan, or isosorbide and the second nonionic surfactant comprises an ethoxylated castor oil, wherein the ratio by weight of the first nonionic surfactant to the second nonionic surfactant is from 1:4 to 2:3, wherein the first nonionic surfactant comprises at least 9% of the total weight of the process additive system and the second nonionic surfactant comprises at least 20% of the total weight of the process additive system, wherein the hydrophobic silica comprises from 3% to 15% of the total weight of the process additive system, wherein the additional additives comprise fatty acid methyl esters, and wherein the additional additives comprise from 5% to 30% of the process additive system.

A method of recovering oil from a process stream of a bioproduct production process, the method comprising the addition of a process additive system to a process stream in a bioproduct production process wherein the process additive system comprises at least one first nonionic surfactant and at least one second nonionic surfactant, wherein the first nonionic surfactant comprises a polysorbate and the second nonionic surfactant comprises an ethoxylated castor oil, wherein the ratio by weight of the first nonionic surfactant to the second nonionic surfactant is from 2:3 to 4:1, wherein the first nonionic surfactant comprises at least 40% of the total weight of the process additive system and the second nonionic surfactant comprises at least 20% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant and at least one additional additive, wherein the first nonionic surfactant comprises a polysorbate and the second nonionic surfactant comprises an ethoxylated castor oil, wherein the ratio by weight of the first nonionic surfactant to the second nonionic surfactant is from 2:3 to 4:1, wherein the first nonionic surfactant comprises at least 14% of the total weight of the process additive system and the second nonionic surfactant comprises at least 8% of the total weight of the process additive system, wherein the additional additives are selected from the group consisting of fatty acid alkyl esters, PEG fatty alcohol esters, monoglycerides, diglycerides, triglycerides, mineral oils and alcohols, and wherein the additional additives comprise from 0.1% to 50% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant and at least one additional additive, wherein the first nonionic surfactant comprises a polysorbate and the second nonionic surfactant comprises an ethoxylated castor oil, wherein the ratio by weight of the first nonionic surfactant to the second nonionic surfactant is from 2:3 to 4:1, wherein the first nonionic surfactant comprises at least 20% of the total weight of the process additive system and the second nonionic surfactant comprises at least 11% of the total weight of the process additive system, wherein the additional additives are selected from the group consisting of fatty acid alkyl esters, PEG fatty alcohol esters, monoglycerides, diglycerides, triglycerides, mineral oils and alcohols, and wherein the additional additives comprise from 5% to 30% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant and at least one additional additive, wherein the first nonionic surfactant comprises a polysorbate and the second nonionic surfactant comprises an ethoxylated castor oil, wherein the ratio by weight of the first nonionic surfactant to the second nonionic surfactant is from 2:3 to 4:1, wherein the first nonionic surfactant comprises at least 14% of the total weight of the process additive system and the second nonionic surfactant comprises at least 8% of the total weight of the process additive system, wherein the additional additives comprise fatty acid methyl esters, and wherein the additional additives comprise from 0.1% to 50% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant and at least one additional additive, wherein the first nonionic surfactant comprises a polysorbate and the second nonionic surfactant comprises an ethoxylated castor oil, wherein the ratio by weight of the first nonionic surfactant to the second nonionic surfactant is from 2:3 to 4:1, wherein the first nonionic surfactant comprises at least 20% of the total weight of the process additive system and the second nonionic surfactant comprises at least 11% of the total weight of the process additive system, wherein the additional additives comprise fatty acid methyl esters, and wherein the additional additives comprise from 5% to 30% of the total weight of the process additive system.

A method of recovering oil from a process stream of a bioproduct production process, the method comprising the addition of a process additive system to a process stream in a bioproduct production process wherein the process additive system comprises at least one first nonionic surfactant and at least one second nonionic surfactant, wherein the first nonionic surfactant comprises a polysorbate and the second nonionic surfactant comprises an ethoxylated castor oil, wherein the ratio by weight of the first nonionic surfactant to the second nonionic surfactant is from 1:1 to 3:1, wherein the first nonionic surfactant comprises at least 50% of the total weight of the process additive system and the second nonionic surfactant comprises at least 25% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant and at least one additional additive, wherein the first nonionic surfactant comprises a polysorbate and the second nonionic surfactant comprises an ethoxylated castor oil, wherein the ratio by weight of the first nonionic surfactant to the second nonionic surfactant is from 1:1 to 3:1, wherein the first nonionic surfactant comprises at least 16% of the total weight of the process additive system and the second nonionic surfactant comprises at least 10% of the total weight of the process additive system, wherein the additional additives are selected from the group consisting of fatty acid alkyl esters, PEG fatty alcohol esters, monoglycerides, diglycerides, triglycerides, mineral oils and alcohols, and wherein the additional additives comprise from 0.1% to 50% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant and at least one additional additive, wherein the first nonionic surfactant comprises a polysorbate and the second nonionic surfactant comprises an ethoxylated castor oil, wherein the ratio by weight of the first nonionic surfactant to the second nonionic surfactant is from 1:1 to 3:1, wherein the first nonionic surfactant comprises at least 23% of the total weight of the process additive system and the second nonionic surfactant comprises at least 14% of the total weight of the process additive system, wherein the additional additives are selected from the group consisting of fatty acid alkyl esters, PEG fatty alcohol esters, monoglycerides, diglycerides, triglycerides, mineral oils and alcohols, and wherein the additional additives comprise from 5% to 30% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant and at least one additional additive, wherein the first nonionic surfactant comprises a polysorbate and the second nonionic surfactant comprises an ethoxylated castor oil, wherein the ratio by weight of the first nonionic surfactant to the second nonionic surfactant is from 1:1 to 3:1, wherein the first nonionic surfactant comprises at least 16% of the total weight of the process additive system and the second nonionic surfactant comprises at least 10% of the total weight of the process additive system, wherein the additional additives comprise fatty acid methyl esters, and wherein the additional additives comprise from 0.1% to 50% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant and at least one additional additive, wherein the first nonionic surfactant comprises a polysorbate and the second nonionic surfactant comprises an ethoxylated castor oil, wherein the ratio by weight of the first nonionic surfactant to the second nonionic surfactant is from 1:1 to 3:1, wherein the first nonionic surfactant comprises at least 23% of the total weight of the process additive system and the second nonionic surfactant comprises at least 14% of the total weight of the process additive system, wherein the additional additives comprise fatty acid methyl esters, and wherein the additional additives comprise from 5% to 30% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant and hydrophobic silica, wherein the first nonionic surfactant comprises a polysorbate and the second nonionic surfactant comprises an ethoxylated castor oil, wherein the ratio by weight of the first nonionic surfactant to the second nonionic surfactant is from 1:4 to 2:3, wherein the first nonionic surfactant comprises at least 14% of the total weight of the process additive system and the second nonionic surfactant comprises at least 31% of the total weight of the process additive system, wherein the hydrophobic silica comprises from 3% to 15% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, at least one additional additive and hydrophobic silica, wherein the first nonionic surfactant comprises a polysorbate and the second nonionic surfactant comprises an ethoxylated castor oil, wherein the ratio by weight of the first nonionic surfactant to the second nonionic surfactant is from 1:4 to 2:3, wherein the first nonionic surfactant comprises at least 5% of the total weight of the process additive system and the second nonionic surfactant comprises at least 13% of the total weight of the process additive system, wherein the hydrophobic silica comprises from 3% to 15% of the total weight of the process additive system, wherein the additional additives are selected from the group consisting of fatty acid alkyl esters, PEG fatty alcohol esters, monoglycerides, diglycerides, triglycerides, mineral oils, and alcohols, and wherein the additional additives comprise from 0.1% to 50% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, at least one additional additive and hydrophobic silica, wherein the first nonionic surfactant comprises a polysorbate and the second nonionic surfactant comprises an ethoxylated castor oil, wherein the ratio by weight of the first nonionic surfactant to the second nonionic surfactant is from 1:4 to 2:3, wherein the first nonionic surfactant comprises at least 9% of the total weight of the process additive system and the second nonionic surfactant comprises at least 20% of the total weight of the process additive system, wherein the hydrophobic silica comprises from 3% to 15% of the total weight of the process additive system, wherein the additional additives are selected from the group consisting of fatty acid alkyl esters, PEG fatty alcohol esters, monoglycerides, diglycerides, triglycerides, mineral oils and alcohols, and wherein the additional additives comprise from 5% to 30% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, at least one additional additive and hydrophobic silica, wherein the first nonionic surfactant comprises a polysorbate and the second nonionic surfactant comprises an ethoxylated castor oil, wherein the ratio by weight of the first nonionic surfactant to the second nonionic surfactant is from 1:4 to 2:3, wherein the first nonionic surfactant comprises at least 5% of the total weight of the process additive system and the second nonionic surfactant comprises at least 13% of the total weight of the process additive system, wherein the hydrophobic silica comprises from 3% to 15% of the total weight of the process additive system, wherein the additional additives comprise fatty acid methyl esters, and wherein the additional additives comprise from 0.1% to 50% of the total weight of the process additive system.

A method of recovering oil from a process stream of a bioproduct production process, the method comprising the addition of a process additive system to a process stream in a bioproduct production process wherein the process additive system comprises at least one first nonionic surfactant, at least one second nonionic surfactant, at least one additional additive and hydrophobic silica, wherein the first nonionic surfactant comprises a polysorbate and the second nonionic surfactant comprises an ethoxylated castor oil, wherein the ratio by weight of the first nonionic surfactant to the second nonionic surfactant is from 1:4 to 2:3, wherein the first nonionic surfactant comprises at least 9% of the total weight of the process additive system and the second nonionic surfactant comprises at least 20% of the total weight of the process additive system, wherein the hydrophobic silica comprises from 3% to 15% of the total weight of the process additive system, wherein the additional additives comprise fatty acid methyl esters, and wherein the additional additives comprise from 5% to 30% of the total weight of the process additive system.

The method of any one of the preceding embodiment or feature wherein the process additive system is added to a process stream prior to the oil separation step wherein the process stream is selected from the group consisting of the thin stillage, syrup concentrate, and combinations thereof.

The method of any preceding embodiment or feature wherein separation step comprises centrifugation.

The method of any one of the preceding embodiment or feature wherein the bioproduct production process is a grain to ethanol production process.

The present invention can include any combination of these various embodiments or features above and/or below. Any combination of disclosed embodiments and/or features herein is considered part of the present.

The present invention will be further clarified by the following examples, which are intended to be only exemplary of the present invention.

EXAMPLES

Raw Materials

The raw materials used in the examples comprise the following. Polysorbate 80, also known as POE (20) sorbitan monooleate, PEG-36 Castor Oil, PEG-30 Castor Oil, hydrophobic silica, and fatty acid methyl ester derived from soybeans. Both "syrup" and "corn syrup" refer to concentrated thin stillage from dry milling corn to ethanol producers.

Example 1

The effect of the use of Polysorbate 80 with PEG-36 Castor Oil on process additive system efficacy was examined. Process additive systems were tested by addition of a predetermined dose to 80 mL of corn syrup at 90° C. then briefly mixed. 65 mL of each sample was transferred to a centrifuge tube and was then centrifuged for 10 minutes at 2000 rpm. The amount of oil was determined by measuring the height of the oil layer in the centrifuge tube.

TABLE 1

| Composition (wt %) | | Oil Released (mm) at Dose of | | |
|---|---|---|---|---|
| Polysorbate 80 | PEG-36 Castor Oil | 100 ppm | 250 ppm | 500 ppm |
| 100% | | 4.8 | 12.0 | 18.0 |
| 75% | 25% | 7.6 | 19.4 | 26.5 |
| 50% | 50% | 10.0 | 21.2 | 24.0 |
| 25% | 75% | 8.6 | 16.2 | 21.0 |
| | 100% | 5.0 | 15.8 | 19.0 |

As can be seen in Table 1, the use of Polysorbate 80 with PEG-36 Castor Oil resulted in significantly increased oil release when compared to Polysorbate 80 or PEG-36 Castor Oil alone. This is unexpected since the expectation would be that the performance of the mixtures containing both Polysorbate 80 and PEG-36 Castor Oil would not be greater than that of the Polysorbate 80 and PEG-36 Castor Oil when used alone.

Example 2

The effect of the use of Polysorbate 80 with PEG-36 Castor Oil on process additive system efficacy was examined. Process additive systems also contained hydrophobic silica with or without soybean fatty acid methyl ester. Process additive systems were tested by addition of a 200 ppm dose to 80 mL of corn syrup at 90° C. then briefly mixed. 65 mL of each sample was transferred to a centrifuge tube and was then centrifuged for 30 minutes at 2000 rpm. The amount of oil was determined by measuring the height of the oil layer in the centrifuge tube.

TABLE 2

| Composition (wt %) | | | | Oil Released (mm) |
|---|---|---|---|---|
| Polysorbate 80 | PEG-36 Castor Oil | Soybean Fatty Acid Methyl Ester | Hydrophobic Silica | |
| 90% | | | 10% | 19.0 |
| 36% | 54% | | 10% | 20.3 |
| 72% | | 18% | 10% | 18.7 |
| 63% | 27% | | 10% | 19.7 |
| 18% | 54% | 18% | 10% | 22.0 |
| 27% | 27% | 36% | 10% | 20.5 |
| 45% | 27% | 18% | 10% | 20.5 |
| | 90% | | 10% | 18.5 |
| 54% | | 36% | 10% | 17.5 |
| | 54% | 36% | 10% | 15.0 |

As can be seen in Table 2, the process additive systems containing both Polysorbate 80 and PEG-36 Castor Oil resulted in significantly increased oil release when compared to those containing either Polysorbate 80 or PEG-36 Castor Oil without the other. This is unexpected since the expectation would be that the performance of the mixtures containing both Polysorbate 80 and PEG-36 Castor Oil would not be greater than that of the mixtures containing either Polysorbate 80 or PEG-36 Castor Oil, but not both.

Example 3

Polysorbate 80 (Additive 1) and a blend of 50 wt % Polysorbate 80 with 40 wt % PEG-36 Castor Oil and 10 wt % soybean fatty acid methyl esters (Additive 2) were added into the syrup feed line on the inlet side of the pump feeding a disk stack centrifuge in a corn to ethanol process. The resulting corn oil production is shown in Table 3. Change in process additive dosage and change in oil production are compared to baseline data obtained from Polysorbate 80 in its initial test. All tests were conducted sequentially and the order of testing is shown in Table 3. Additive 1 was tested at the beginning and end of the run to confirm oil production returned to baseline levels.

TABLE 3

| | Additive 1 | Additive 2 | Additive 2 | Additive 2 | Additive 1 |
|---|---|---|---|---|---|
| Order of Testing | 1 | 2 | 3 | 4 | 5 |
| Dose (ppm) | 920 | 800 | 660 | 920 | 920 |
| Change in Dose | | −13% | −28% | 0% | 0% |
| Oil Production (gal/min) | 3.42 | 3.50 | 3.71 | 3.63 | 3.41 |
| Change in Oil Production | | 2% | 8% | 6% | −1% |

As shown in Table 3, the process additive systems containing both Polysorbate 80 and PEG-36 Castor Oil resulted in a greater quantity of oil produced per quantity of additive used when compared to Polysorbate 80 alone.

Example 4

A blend of 85 wt % Polysorbate 80 with 10 wt % hydrophobic silica and 5 wt % soybean fatty acid methyl esters (Additive 1) and a blend of 20 wt % Polysorbate 80 with 60 wt % PEG-36 Castor Oil, 10 wt % hydrophobic silica, and 10 wt % soybean fatty acid methyl esters (Additive 2) were added into the syrup feed line on the inlet side of the pump feeding two disk stack centrifuges in a corn to ethanol process. The resulting corn oil production is shown in Table 4. Oil production was calculated by dividing the oil production (gal/min) by the syrup flowrate (gal/min). Change in process additive dosage and change in oil production are compared to baseline data obtained from Additive 1 in its initial test. All tests were conducted sequentially and the order of testing is shown in Table 4. Additive 1 was tested at the beginning and end of the run to confirm oil production returned to baseline levels.

TABLE 4

| | Additive 1 | Additive 2 | Additive 2 | Additive 1 |
|---|---|---|---|---|
| Order of Testing | 1 | 2 | 3 | 5 |
| Dose (ppm) | 223 | 193 | 158 | 229 |
| Change in Dose | | −13% | −29% | 3% |
| Oil Production (vol %) | 2.82% | 2.81% | 2.82% | 2.83% |
| Change in Oil Production | | 0% | 0% | 0% |

As shown in Table 4, the process additive systems containing both Polysorbate 80 and PEG-36 Castor Oil resulted in a greater quantity of oil produced per quantity of additive used when compared to Polysorbate 80 alone.

Example 5

The effect of the use of Polysorbate 80 with PEG-30 Castor Oil on process additive system efficacy was examined. Process additive systems were tested by addition of a 500 ppm dose to 80 mL of corn syrup at 90° C. then briefly mixed. A sample of the treated syrup was transferred to a centrifuge tube and was then centrifuged for 20 minutes at 4000 rpm. The amount of oil was determined by measuring the height of the oil layer in the centrifuge tube.

TABLE 5

| Composition (wt %) | | Oil Released (Vol %) |
|---|---|---|
| Polysorbate 80 | PEG-30 Castor Oil | |
| 100% | | 3.7 |
| 75% | 25% | 4.6 |
| 25% | 75% | 3.8 |
| | 100% | 3.1 |

As can be seen in Table 5, the use of Polysorbate 80 with PEG-30 Castor Oil resulted in significantly increased oil release when compared to Polysorbate 80 or PEG-30 Castor Oil alone. This is unexpected since the expectation would be that the performance of the mixtures containing both Polysorbate 80 and PEG-30 Castor Oil would not be greater than that of the Polysorbate 80 and PEG-30 Castor Oil when used alone.

Example 6

The effect of the use of Polysorbate 80 with PEG-36 Castor Oil on process additive system efficacy was examined. Process additive systems also contained hydrophobic silica. Process additive systems were tested by addition of a 150 ppm dose to 80 mL of corn syrup at 90° C. then briefly mixed. A sample was transferred to a centrifuge tube and was then centrifuged for 2 minutes at 4000 rpm. The amount of oil was determined by measuring the height of the oil layer in the centrifuge tube.

TABLE 6

| Composition (wt %) | | | Oil |
|---|---|---|---|
| Polysorbate 80 | PEG-36 Castor Oil | Hydrophobic Silica | Released (Vol %) |
| 90% | 0% | 10% | 2.89 |
| 72% | 18% | 10% | 2.83 |
| 63% | 27% | 10% | 3.18 |
| 54% | 36% | 10% | 3.29 |
| 45% | 45% | 10% | 3.20 |
| 36% | 54% | 10% | 3.33 |
| 0% | 90% | 10% | 2.62 |

As can be seen in Table 6, the process additive systems containing both Polysorbate 80 and PEG-36 Castor Oil in certain ratios increases oil production when compared to those containing either Polysorbate 80 or PEG-36 Castor Oil.

Example 7

The effect of the use of Polysorbate 80 with PEG-36 Castor Oil on process additive system efficacy was examined. Process additive systems also contained hydrophobic silica. Process additive systems were tested by addition of either a 300, 400, or 600 ppm dose to 80 mL of corn syrup at 90° C. then briefly mixed. A sample was transferred to a centrifuge tube and was then centrifuged for 2 minutes at 4000 rpm. The amount of oil was determined by measuring the height of the oil layer in the centrifuge tube. The change in oil production for each process additive system was calculated by dividing the oil released by the process additive system by the oil released from the reference products, Polysorbate 80 and PEG-36 Castor Oil.

TABLE 7

| Composition (wt %) | | | Oil |
|---|---|---|---|
| Polysorbate 80 | PEG-36 Castor Oil | Hydrophobic Silica | Released (Vol %) |
| 90% | 0% | 10% | 1.64 |
| 54% | 36% | 10% | 2.65 |
| 45% | 45% | 10% | 2.88 |
| 36% | 54% | 10% | 2.03 |
| 27% | 63% | 10% | 1.85 |
| 18% | 72% | 10% | 0.85 |
| 0% | 90% | 10% | 1.43 |

As can be seen in Table 7, the process additive systems containing both Polysorbate 80 and PEG-36 Castor Oil in certain ratios increases oil production when compared to those containing either Polysorbate 80 or PEG-36 Castor Oil.

Example 8

The effect of the use of Polysorbate 80 with PEG-30 Castor Oil on process additive system efficacy was examined with 5% hydrophobic silica. Process additive systems were tested by addition of a 150 ppm dose to 80 mL of corn syrup at 90° C. then briefly mixed. A sample was transferred to a centrifuge tube and was then centrifuged for 2 minutes at 4000 rpm. The amount of oil was determined by measuring the height of the oil layer in the centrifuge tube.

TABLE 8

| Composition (wt %) | | | Oil |
|---|---|---|---|
| Polysorbate 80 | PEG-30 Castor Oil | Hydrophobic Silica | Released (Vol %) |
| 95.0% |  | 5.0% | 2.91 |
| 47.5% | 47.5% | 5.0% | 3.44 |
|  | 95.0% | 5.0% | 3.32 |

As can be seen in Table 8, the process additive systems containing both Polysorbate 80 and PEG-30 Castor Oil resulted in significantly increased oil release when compared to those containing either Polysorbate 80 or PEG-30 Castor Oil without the other. This is unexpected since the expectation would be that the performance of the mixtures containing both Polysorbate 80 and PEG-30 Castor Oil would not be greater than that of the mixtures containing either Polysorbate 80 or PEG-30 Castor Oil, but not both.

The invention claimed is:

1. A method for recovering oil from grain to bioproduct production, the method comprising adding a process additive system to a process stream in a grain to bioproduct production wherein the process additive system comprises at least one first nonionic surfactant and at least one second nonionic surfactant,
wherein the first nonionic surfactant comprises POE (20) sorbitan monooleate and the second nonionic surfactant comprises an alkoxylated triglyceride and
wherein the first nonionic surfactant comprises at least 3% of the total weight of the process additive system and the second nonionic surfactant comprises at least 3% of the total weight of the process additive system and
wherein the ratio by weight of the first nonionic surfactant to the second nonionic surfactant is from 1:3 to 3:1.

2. The method of claim 1 wherein the first nonionic surfactant comprises a functionalized polyol derived from a sorbitan.

3. The method of claim 1 wherein the second nonionic surfactant comprises an alkoxylated castor oil.

4. The method of claim 1 wherein the second nonionic surfactant comprises an alkoxylated castor oil that has been alkoxylated with from about 15 to about 60 moles of an alkyl oxide wherein the alkyl oxide is selected from ethylene oxide, propylene oxide, and mixtures thereof.

5. The method of claim 1 wherein the second nonionic surfactant comprises an ethoxylated castor oil.

6. The method of claim 1 wherein the process additive system further comprises silica wherein the silica comprises from 3% to 15% of the total weight of the process additive system.

7. The method of claim 6 wherein the silica is a hydrophobic silica.

8. The method of claim 1 wherein the ratio by weight of the first nonionic surfactant to the second nonionic surfactant is from 1:2 to 2:1.

9. The method of claim 1 wherein the first nonionic surfactant comprises at least 8% of the total weight of the process additive system and the second nonionic surfactant comprises at least 8% of the total weight of the process additive system.

10. The method of claim 1 wherein the ratio by weight of the first nonionic surfactant to the second nonionic surfactant is from 1:1 to 3:1.

11. The method of claim 1 wherein the process additive system further comprises additional additives, wherein the additional additives comprise from 0.1% to 50% of the total weight of the process additive system, wherein at least one additional additive is selected from the group consisting of fatty acid alkyl esters, PEG fatty alcohol esters, monoglycerides, diglycerides, triglycerides, mineral oils, fatty alcohols, and combinations thereof.

12. The method of claim 1 wherein the process additive system further comprises additional additives, wherein the additional additives comprise from 0.1% to 50% of the total weight of the process additive system, wherein at least one additional additive comprises PEG fatty acid esters.

13. The method of claim 11 wherein the additional additives comprises fatty acid alkyl esters and wherein the additional additives comprise from 5% to 30% of the total weight of the process additive system.

14. The method of claim 13 wherein the additional additives comprise fatty acid methyl esters.

15. The method of claim 1 wherein the process additive system is added to the process stream in an amount of from 50 to 2000 ppm (mg/L) based on the weight of the process additive system and the volume of the process stream.

16. A method of recovering oil from a process stream of a bioproduct production process, the method comprising the addition of a process additive system to a process stream in a bioproduct production process wherein the process additive system comprises at least one first nonionic surfactant and at least one second nonionic surfactant, wherein the first nonionic surfactant comprises POE (20) sorbitan monooleate a and the second nonionic surfactant comprises an ethoxylated castor oil, wherein the ratio by weight of the first nonionic surfactant to the second nonionic surfactant is from 1:1 to 3:1, wherein the first nonionic surfactant comprises at least 11% of the total weight of the process additive system and the second nonionic surfactant comprises at least 7% of the total weight of the process additive system.

17. A method of recovering oil from a process stream of a bioproduct production process, the method comprising the addition of a process additive system to a process stream in a bioproduct production process wherein the process additive system comprises at least one first nonionic surfactant and at least one second nonionic surfactant, wherein the first nonionic surfactant comprises POE (20) sorbitan monooleate a and the second nonionic surfactant comprises an ethoxylated castor oil, wherein the ratio by weight of the first nonionic surfactant to the second nonionic surfactant is from 1:1 to 3:1, wherein the first nonionic surfactant comprises at least 50% of the total weight of the process additive system and the second nonionic surfactant comprises at least 25% of the total weight of the process additive system.

18. The method of claim 1 wherein the process additive system is added to a process stream prior to the oil separation step wherein the process stream is selected from the group consisting of the thin stillage, syrup concentrate, and combinations thereof.

19. The method of claim 1 wherein the process additive system is added to the process stream via more than one addition point.

20. The method of claim 19 wherein the process additive system is added to the process stream in an amount of from 50 to 2000 ppm (mg/L) based on the weight of the process additive system and the volume of the process stream.

* * * * *